Feb. 5, 1946.    R. E. BYNOE    2,394,363
HOSE COUPLING UNIT
Filed May 9, 1944
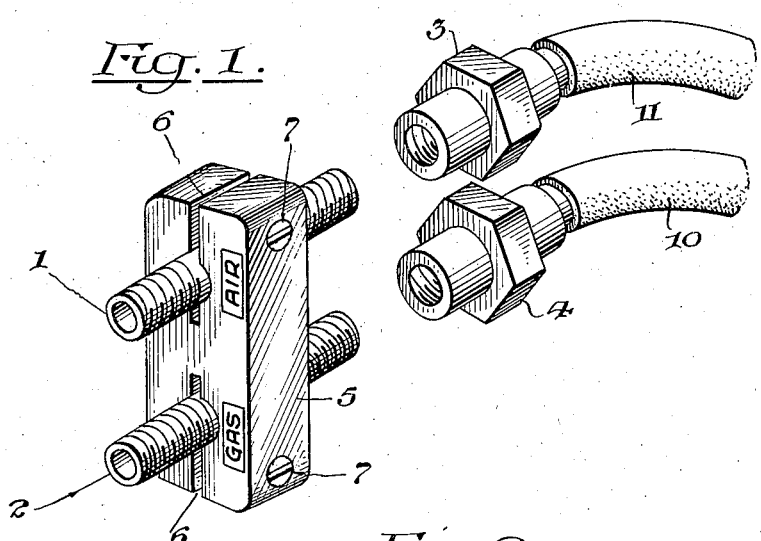
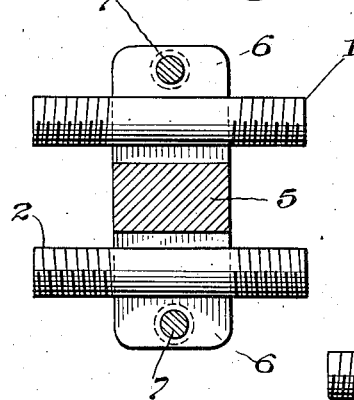
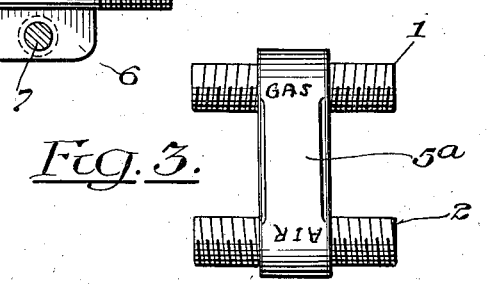
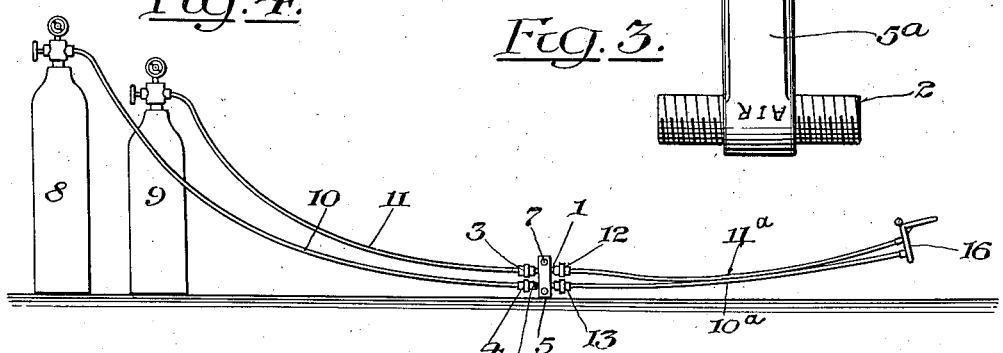
INVENTOR.
Russell E. Bynoe
BY Francis E. Boyer
Attorney.

UNITED STATES PATENT OFFICE 2,394,363

HOSE COUPLING UNIT

Russell E. Bynoe, Brooklyn, N. Y.

Application May 9, 1944, Serial No. 534,731

1 Claim. (Cl. 285—21)

This invention relates to improvements in hose couplings, and more particularly to couplings for use in connection with the gas and air supply lines to a blow torch.

As is well known, in the use of blow pipes and torches for heating and cutting it is common practice to supply the necessary gas and air through individual hoses which are usually taped together and connected separately to the torch. Moreover, it is of the utmost importance that no mistake be made as to the respective connections, and in order to minimize the liability of such mistakes each hose is of a color clearly distinguishable from the other and as a further precaution one hose, usually the gas hose, is equipped with a left-hand threaded connecting member while the other hose, usually the air hose, is provided with a right-hand threaded connecting member.

When the torch is to be used at a considerable distance from the sources of supply of gas and air, as for instance in the burning out of broken or damaged plates on a ship, it is frequently necessary to add additional lengths of hose in order to reach the job. Heretofore, this has been done by the use of individual nipples threaded to correspond with the hose connections, which necessitated not only that the worker carry two separate nipples either or both of which may easily be lost, but he must also have two wrenches, one to hold each nipple against rotation while its hose connections are being applied by means of the other wrench, and after the connections have been applied to both ends of the nipples the two wrenches are used on the connectors at the opposite ends of the nipples to tighten up the connections. It sometimes happens that the workman, while performing such an operation, drops one of his wrenches, which of course necessitates leaving the job to recover the lost wrench or to get another. Moreover, there is always the liability that the workman, through inadvertence, may take with him two nipples both having the same thread, either right-hand or left-hand, which will again require him to leave the work to get a nipple having the proper thread, all of which results in considerable loss of time, which added to the incidental loss of wrenches renders the work more costly.

The coupling herein described not only ensures that the workman has with him nipples having the proper threads for the respective hose connections, but renders it entirely practical to tighten up the connections with a single wrench, thus eliminating loss of time and wrenches.

Further advantages of the invention will appear as the description proceeds.

In the drawing accompanying this specification:

Fig. 1 is a perspective view of a coupling unit constructed in accordance with the present invention and showing the ends of the air and gas hoses disconnected from the coupling;

Fig. 2 is a vertical sectional view of the coupling shown in Fig. 1;

Fig. 3 is a side view showing a modified form of coupling unit; and

Fig. 4 is a side view on a smaller scale illustrating the complete assembly of gas and air tanks with their hoses connected by means of the improved coupling to additional lengths of hose, and a burner or torch, conventionally illustrated, attached to the free ends of the added lengths of hose.

The same characters of reference designate the same parts in the different figures of the drawing.

Referring to the drawing, 1 and 2 indicate a pair of nipples, usually of brass, one having left-hand threads and the other right-hand threads at both ends thereof for connection respectively with the usual gas and air hose swivel couplings 3 and 4.

The nipples 1 and 2 are assembled into one complete unit by mounting them in separate openings formed in a block or plate which may be of brass or other suitable material. In Figs. 1 and 2 the block 5 is shown split for some distance inward from its opposite ends, as indicated at 6, to permit insertion of the nipples without danger of injury to their threads, a pair of countersunk screws 7 being threaded into the block transversely of the split ends whereby the nipples after being properly positioned in the block may be tightly clamped therein by tightening up said screws. In the form shown in Fig. 3 the block 5a is of solid form and the nipples may be secured therein by brazing, swaging or soldering. On the other hand the entire unit comprising the block 5a and the nipples may be formed as an integral structure by taking a block having a width equal to the length of the nipples and boring a pair of holes therethrough at the points where the nipples are to be located. The block may then be cut away between said points at opposite sides thereof, leaving sufficient metal around said openings and projecting from the block a sufficient distance to form nipples of the desired length, which may then be shaped and threaded as desired.

As will be obvious, the split block permits the ready removal of one or both nipples in the event of damage to their threads and substitution of a new undamaged nipple or nipples. However, the solid block unit shown in Fig. 3 is simpler in construction and can probably be produced at less cost. In either form the block is preferably marked on opposite sides thereof to indicate clearly the proper nipples for connection to the gas and air hoses respectively. As shown in the drawing, the words "Gas" and "Air" are either cast in the block, or may be stamped or painted thereon adjacent the respective openings for the nipples, so as to minimize the liability of error in inserting the nipples and in connecting them with the proper hoses.

In the assembly shown in Fig. 4, the gas and air tanks 8 and 9 are provided with the usual lengths of hose 10 and 11, which in practice are differently colored so as to be clearly distinguishable one from the other. The nipples 1 and 2 are each connected at one end to the swivel couplings 3 and 4 at the ends of the respective lengths of hose, the opposite ends of the nipples being connected to similar swivel couplings 12 and 13 carried respectively at one end of additional lengths of hose 10a and 11a, the opposite ends of which are connected to the burner 16.

When attaching the coupling unit above described, the operator merely holds the unit in one hand while with the other hand he starts the swivel couplings carried by the lengths of hose into engagement with the threads of the nipples and, after turning them on as far as possible with the hand, while still holding the coupling unit in one hand he uses a single wrench to tighten up all of the swivel couplings, his grasp on the unit affording sufficient resistance to permit the swivel couplings to be turned up on the nipples as tightly as desired. The unit thus eliminates the necessity of having two wrenches and the attendant disadvantages hereinbefore pointed out.

Having thus described my invention, what I claim is:

A hose coupling unit comprising a block having a pair of openings passing therethrough, in parallel relation, said block being split from its opposite ends inward through the centers of said openings respectively, a pair of threaded nipples disposed in said openings and extending from opposite sides of the block, and means for drawing the split portions of the block together at the opposite ends thereof thereby to secure the nipples against rotation in said openings.

RUSSELL E. BYNOE.